(12) United States Patent
Becker et al.

(10) Patent No.: US 10,661,683 B2
(45) Date of Patent: May 26, 2020

(54) SEAT-ADJUSTING MECHANISM FOR A SEAT WITH A PIVOT-SLIDE UNIT

(71) Applicant: Sitech Sitztechnik GmbH, Wolfsburg (DE)

(72) Inventors: Nicolas Becker, Lehre (DE); Tomas Barkow, Braunschweig (DE); Michal Niewinowski, Zielona Gora (PL); Michal Szewczyk, Przemkow (PL); Thorsten Schnettker, Dahlum (DE); Lukasz Pyziak, Nysa (PL); Stanislaw Klajn, Wroclaw (PL); Tomasz Soliwoda, Wroclaw (PL)

(73) Assignee: Sitech Sitztechnik GmbH, Wolfsburg (DE)

( * ) Notice: Subject to any disclaimer, the term of this patent is extended or adjusted under 35 U.S.C. 154(b) by 0 days.

(21) Appl. No.: 15/976,389

(22) Filed: May 10, 2018

(65) Prior Publication Data

US 2018/0257516 A1 Sep. 13, 2018

Related U.S. Application Data

(63) Continuation of application No. PCT/EP2016/076925, filed on Nov. 8, 2016.

(30) Foreign Application Priority Data

Nov. 10, 2015 (DE) .................. 10 2015 222 133

(51) Int. Cl.
*B60N 2/12* (2006.01)
*B60N 2/30* (2006.01)

(52) U.S. Cl.
CPC .............. *B60N 2/12* (2013.01); *B60N 2/3011* (2013.01); *B60N 2/3022* (2013.01);
(Continued)

(58) Field of Classification Search
CPC ...... B60N 2/12; B60N 2/3011; B60N 2/3022; B60N 2/3031; B60N 2/3056; B60N 2/3065
(Continued)

(56) References Cited

U.S. PATENT DOCUMENTS 7,040,684 B2 * 5/2006 Tame .................. B60N 2/206
296/65.01
7,562,926 B2 7/2009 Kojima
(Continued)

FOREIGN PATENT DOCUMENTS

CN 101018689 A 8/2007
DE 10 2007 036 450 B3 1/2009
(Continued)

OTHER PUBLICATIONS

Chinese Office Action dated Nov. 19, 2019 in corresponding application 201680065761.2.

*Primary Examiner* — Syed A Islam
(74) *Attorney, Agent, or Firm* — Muncy, Geissler, Olds & Lowe, P.C.

(57) ABSTRACT

A seat adjustment mechanism of a seat for facilitating entry and exit of a person into/out of an interior of a motor vehicle, wherein a backrest part is forcibly coupled to a seat part via a rocker arm such that an adjusting movement of the backrest part is transmitted to the seat part. The backrest part and the seat part of the seat are moved from a starting position to an intermediate position by a first predetermined horizontal length by means of a sliding device which is connected to an upper rail of a seat rail, wherein the backrest part is rigidly connected to a backrest release unit of the backrest part via a coupling element, which is pivotable about a first coupling element pivot axis with respect to the sliding device.

8 Claims, 4 Drawing Sheets

(52) U.S. Cl.
CPC ......... *B60N 2/3031* (2013.01); *B60N 2/3056* (2013.01); *B60N 2/3065* (2013.01)

(58) Field of Classification Search
USPC .......................................................... 297/341
See application file for complete search history.

(56) References Cited

U.S. PATENT DOCUMENTS

| | | |
|---|---|---|
| 8,424,969 B2 | 4/2013 | Kammerer |
| 9,545,857 B2 * | 1/2017 | Cooley .................... B60N 2/20 |
| 2016/0159256 A1 | 6/2016 | Szlag |
| 2016/0339813 A1 | 11/2016 | Dubois et al. |

FOREIGN PATENT DOCUMENTS

| | | | |
|---|---|---|---|
| DE | 10 2008 050 468 B3 | 4/2010 | |
| DE | 102013006485 A1 | 11/2013 | |
| DE | 10 2013 012 284 A1 | 2/2015 | |
| DE | 102013012284 A1 * | 2/2015 | ........... B60N 2/3065 |
| EP | 2386441 A2 | 11/2011 | |
| FR | 2987320 A1 | 8/2013 | |
| WO | WO 2015/107213 A1 | 7/2015 | |

\* cited by examiner

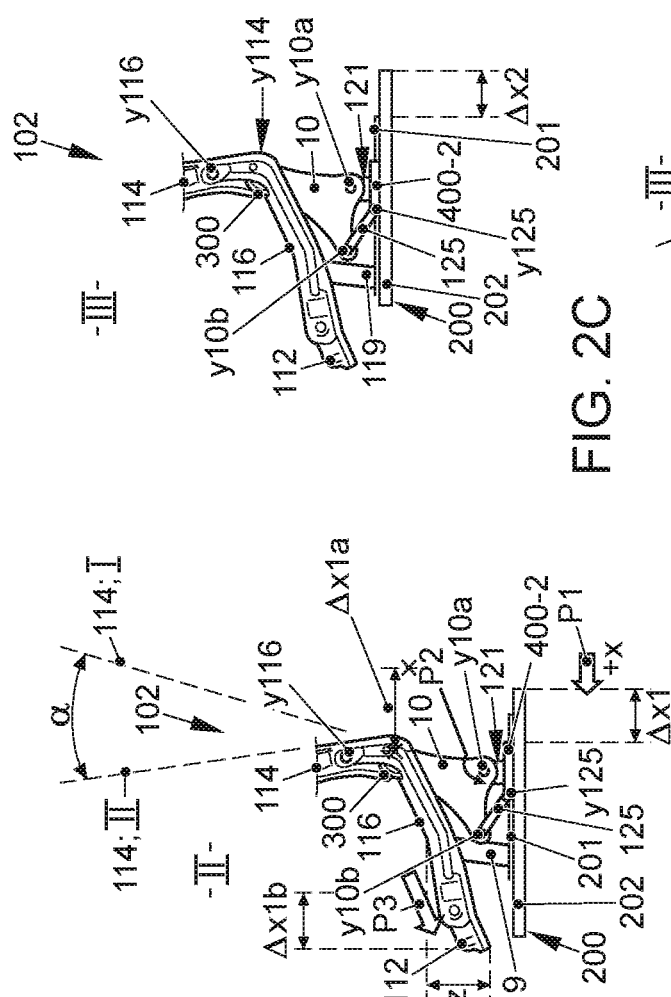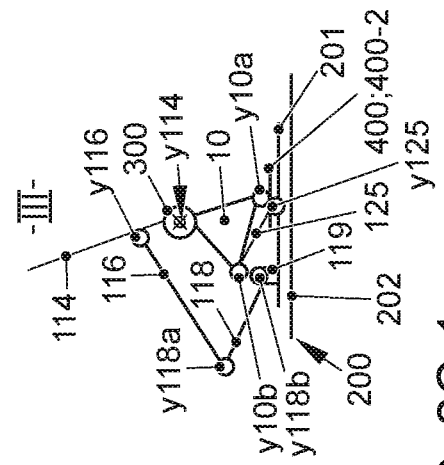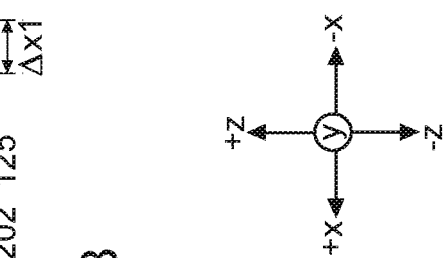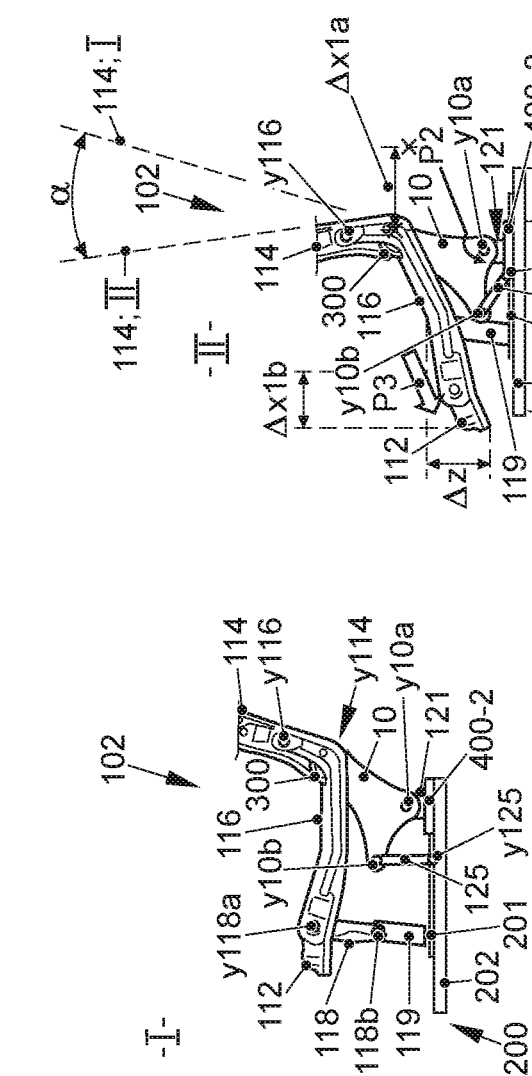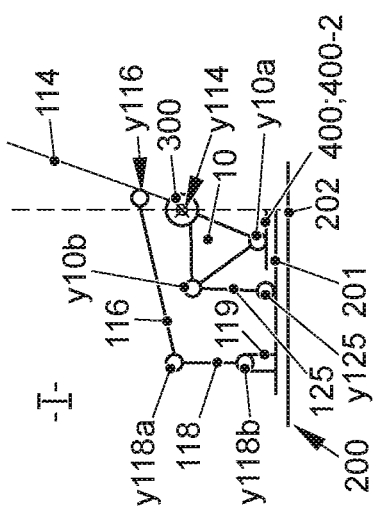

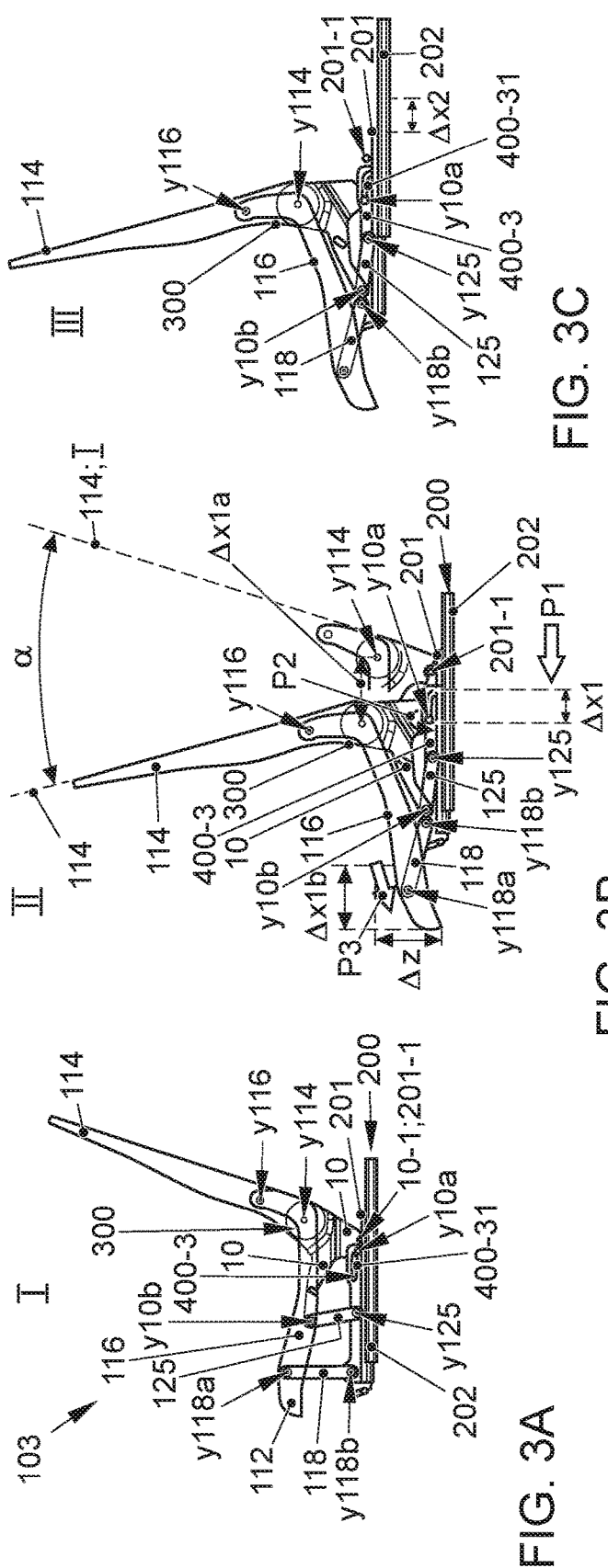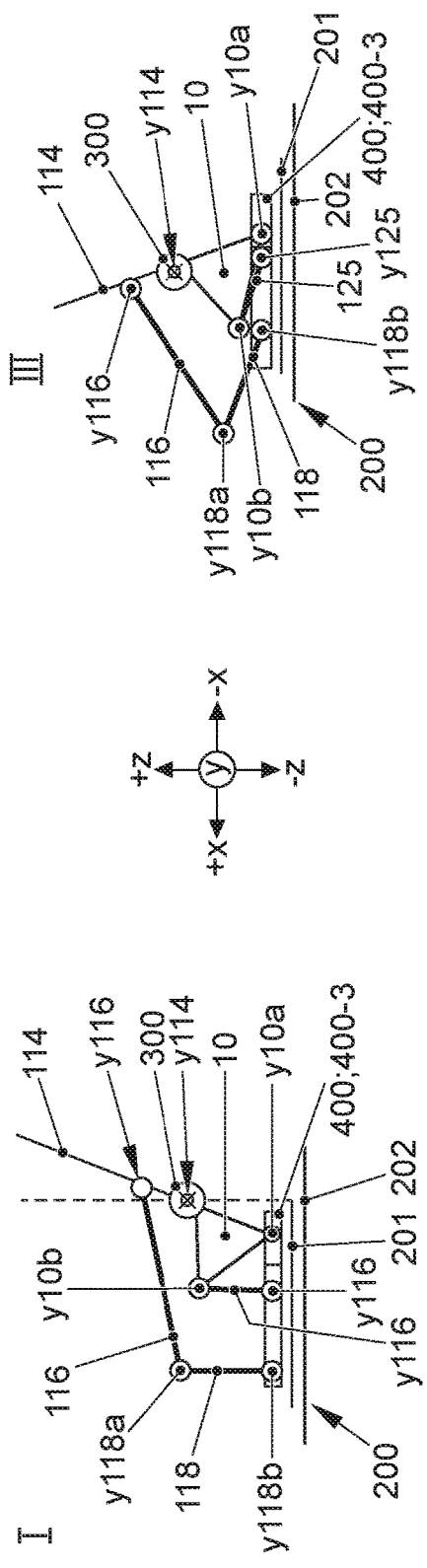

SEAT-ADJUSTING MECHANISM FOR A SEAT WITH A PIVOT-SLIDE UNIT

This nonprovisional application is a continuation of International Application No. PCT/EP2016/076925, which was filed on Nov. 8, 2016, and which claims priority to German Patent Application No. DE10 2015 222 133.4, which was filed in Germany on Nov. 10, 2015, and which are both herein incorporated by reference.

BACKGROUND OF THE INVENTION

Field of the Invention

The present invention relates to a seat adjustment mechanism to create an easy-entry kinematic system of a seat for easier entry and exit of a person into/out of the interior of a motor vehicle.

Description of the Background Art

In a variety of conventional adjustment kinematics for the easy-entry adjustment of vehicle seats, the rear base is decoupled from a seat upper rail of a seat unit consisting of a seat upper rail and a seat lower rail, and is pivoted forward along a curved path by means of at least one articulated lever, which is arranged in the front region also on the seat upper rail. A disadvantage of this solution is the need for a free pivot range between the top of the backrest part or the top of the headrest thereof and the roof lining of the interior of the vehicle. Another disadvantage is that it is only possible to tilt the vehicle seat when the region below the vehicle seat remains clear so it is possible to fold back the vehicle seat. Representing this generic solution are the publications DE 10 2007 036 450 B3 and DE 10 2008 050 468 B3, which corresponds to U.S. Pat. No. 8,424,969.

The publication DE 10 2013 012 284 A1, which corresponds to US2016/0159256, which is incorporated herein by reference, discloses a vehicle seat with an easy-entry adjustment mechanism. Beginning from a starting position of the vehicle seat, the adjustment of the vehicle seat takes place gradually. In a first step, the backrest part is folded back by activating an release element, wherein the release element is arranged in the upper region of the backrest part. In the first step, the backrest part is adjusted in the vehicle longitudinal direction of the vehicle in the usual assembly position of the vehicle seat, wherein the seat part of the vehicle seat is entrained in the vehicle longitudinal direction by a rocker arm that is mounted between a backrest part structure and a seat part structure. A rear base of the vehicle seat is connected to the backrest part by means of a backrest release unit. By means of the backrest release unit, it is possible to tilt the backrest part with respect to the seat part. The rear base is firmly connected to a seat upper rail. The tilting of the backrest part to achieve the easy-entry position in the first step is accompanied by a translatory movement of the seat upper rail, with respect to a seat lower rail. The folding movement of the backrest part in the first step is directly transmitted in a forcibly coupled manner to the seat part by a rocker arm arranged between the backrest part and the seat part. The change in position of the backrest part to the easy-entry position thus takes place combined via a control of the backrest release unit, via which also the release of the seat upper rail with respect to the seat lower rail takes place, so that in a second step, the vehicle seat can be moved in the vehicle longitudinal direction by means of a pivot arm which is pivotally arranged on the seat upper rail.

Also known is the publication WO 2015/107213A1. The publication discloses a vehicle seat with a seat part and a backrest, wherein the vehicle seat has a rear fitting part that is connected to the backrest and a front fitting part that is connected to the seat part, wherein the rear fitting part is coupled to the front fitting part. The coupling comprises a slotted guide and a bolt that is guided in the slotted guide, wherein in particular the front fitting part comprises the slotted guide and the rear fitting part comprises the bolt. In addition, the seat part has a further slotted guide, which cooperates with a further bolt of a coupling element which is disposed between the rear fitting part and the seat part, such that the coupling element is pivotally and longitudinally slidably mounted on the seat part.

SUMMARY OF THE INVENTION

It is therefore an object of the invention to provide an alternative seat adjustment kinematic system for an easy-entry function of a seat which overcomes the disadvantages and is easy to construct.

The basis of the invention is a seat adjustment mechanism of a seat for facilitated entry and exit of a person into/out of an interior of a motor vehicle, in which a backrest part is forcibly coupled to a seat part via a rocker arm, such that an adjusting movement of the backrest part is transmitted to the seat part.

According to an exemplary embodiment of the invention, in a first step beginning from a starting position, the backrest part and the seat part of the seat are moved to an intermediate position by a first predetermined horizontal length by means of a sliding device which is connected to an upper rail of a seat rail, wherein the backrest part is rigidly connected to a backrest release unit of the backrest part via a coupling element that is pivotable about a first coupling element pivot axis with respect to the sliding device.

As a result, in a first step, the backrest part is moved in the longitudinal direction along a first predetermined horizontal backrest part adjustment path, and at the same time, the tilt of the backrest part is adjusted from its starting position to its intermediate position about a predetermined angle, wherein in the first step, the forcibly coupled seat part that is directly or indirectly supported by a pivot arm on the upper rail of the seat rail is moved in the longitudinal direction along a first horizontal seat part adjustment path, and a front side of the seat part is lowered simultaneously along a vertical adjustment path, after which in a second step, the backrest part and the seat part are simultaneously mutually moved by release the upper rail, further in the longitudinal direction along a predetermined second horizontal adjustment path with respect to a body-mounted lower rail of the seat rail to an easy-entry position.

In the first step, the backrest part and the seat part are thus advantageously moved forward in the longitudinal direction and simultaneously pivoted because the seat adjustment mechanism comprises a pivot-slide unit, the components thereof being explained in detail below. In an advantageous manner, the pivot and slide motion of the backrest part and the seat part is possible in the first step without the backrest part tilting via the backrest release unit of the backrest part.

In this case, the coupling element is rigidly connected to the backrest release unit of the backrest part. According to the invention, the coupling element is pivotable about a first coupling element pivot axis, with respect to the sliding device. The connection of the backrest release unit to the sliding device via the pivotable coupling element advantageously allows for the backrest part to pivot and slide forward in the longitudinal direction without activating the backrest release unit.

The invention provides that the forcibly coupled seat part, which is directly supported via the rocker arm on the upper rail of the seat rail (first and second embodiments), or the forcibly coupled seat part, which is indirectly supported via the rocker arm on a sliding device (third embodiment) that is connected to the upper rail of the seat rail, is moved in the first step along the first horizontal seat part adjustment path and that as a result, the front side of the seat part is simultaneously lowered along the vertical adjustment path.

The forward movement in the longitudinal direction and the simultaneous lowering of the front side of the seat part advantageously allows for a space-saving adjustment of the seat.

Furthermore, in the second step the backrest part and the seat part are simultaneously mutually moved forward in the longitudinal direction along the predetermined second horizontal adjustment path to an easy-entry position by release the upper rail with respect to a body-mounted lower rail of the seat rail. It becomes clear that after the pivot and slide movement of the backrest part and the seat part in the first step, a further slide movement of the backrest part and the seat part in the second step is advantageously effected, realized by means of simple structural measures such as the upper rail and the lower rail.

In an advantageous way, an easier entry and exit of a person into/out of the interior of the vehicle is possible already when carrying out the first step because a clearance is created in the region behind the backrest part, which is easily accessible also in the base region due to being free of any seat adjustment mechanism components. The space created after performing the first step is further increased after the second step, as is explained in more detail in the following description part on the basis of two embodiments.

The backrest part can be reversibly adjustable independent of the seat part in each position via the backrest release unit in its tilt with respect to the seat part, wherein the backrest release unit has a rotational adjustment mechanism with a first fitting part that is arranged on the backrest part and a second fitting part that is rigidly arranged on the coupling element.

It becomes clear that the backrest release unit does not have to be released in any of the steps of the inventive easy-entry function.

The backrest release unit can be released for purposes of tilt adjustment of the backrest part and for setting the loading floor position.

However, the backrest release unit is not released during the course of the easy-entry adjustment of the seat, whereby the backrest release unit, as compared to a backrest release unit involved in the easy-entry adjustment of the seat, can be designed less complex.

The coupling element can be part of the second fitting part (one-piece) or is rigidly connected to the second fitting part (two-piece). In other words, it is provided that the rigid connection between the coupling element and the second fitting part is formed as a one-piece or two-part configuration.

In an embodiment, in the first step and beginning from the starting position, the backrest part and the seat part can be forcibly controlled and forcibly guided to the intermediate position via a slotted guide connection, wherein the coupling element is connected via a slotted guide element to the slotted guide of the slotted guide connection, which is arranged in a slotted guide part that is fixed to the upper rail, whereby the coupling element is pivotable about a second coupling element pivot axis with respect to the slotted guide during the forcible control and forcible guidance of the coupling element via the slotted guide element contained in the slotted guide. It is provided that the upper-rail fixed slotted guide part, in which the slotted guide is arranged, can be an upper rail-fixed front base part. The slotted guide connection advantageously ensures that the backrest part and the seat part forcibly coupled with the backrest part are forcibly controlled and forcibly guided in their course of motion from the initial position to the easy-entry position. The seat thereby exhibits great stability and accurate guidance within its course of motion. In addition, forces, in particular crash forces additionally introduced into the vehicle seat are advantageously introduced in the body of the vehicle via the slotted guide connection via the seat rail. In the following description of the first embodiment, the introduction of forces in the vehicle body will be discussed in more detail with reference to the figures.

In an embodiment, in the first step, the backrest part and the seat part can be forcibly controlled and forcibly guided from the initial position to the intermediate position via an articulated lever of an articulated lever connection, wherein at one end the coupling element is pivotally connected via the articulated lever to an upper rail of the seat rail about a second coupling element pivot axis, and at the other end, pivotally connected to the same upper rail of the seat rail about an articulated lever pivot axis, whereby the coupling element is pivotable about the second coupling element pivot axis via the articulated lever during the forcible control and forcible guidance of the coupling element. The articulated lever connection ensures that the backrest part and the seat part forcibly coupled with the backrest part can be forcibly controlled and forcibly guided in their course of motion from the starting position to the easy-entry position. This way, the seat is characterized by great stability and accurate guidance within its course of motion. Moreover, forces advantageously introduced additionally into the vehicle seat, in particular crash forces, are introduced into the body of the motor vehicle via the articulated lever via the seat rail, which is also explained in more detail in the description part.

In an embodiment, in the first step, the backrest part and the seat part can be forcibly controlled and forcibly guided from the starting position to the intermediate position via an articulated lever of an articulated lever connection, wherein the coupling element is pivotally connected to a sliding device, which in turn is firmly connected to an upper rail of the seat rail, at one end via the articulated lever about a second coupling element pivot axis and at the other end about an articulated lever pivot axis, whereby during the forcible control and forcible guidance of the coupling element, the coupling element is pivotable via the articulated lever about the second coupling element pivot axis. The articulated lever connection ensures that the backrest part and the seat part forcibly coupled with the backrest part are advantageously forcibly controlled and forcibly guided in their course of motion from the starting position to the easy-entry position. The seat thereby has great stability and accurate guidance within its course of motion. Moreover, forces additionally introduced to the vehicle seat, in particular crash forces, are introduced via the articulated lever into the sliding device and from there, via the seat rail into the body of the motor vehicle, as is also explained in more detail in the description part.

The coupling element can be directly connected to the sliding device or indirectly via a rear base part to the sliding device, which is arranged on the upper rail and longitudinally displaceable with respect to the upper rail.

The sliding device can be connected to the upper rail of the seat rail, and is arranged either on the upper rail of the seat rail (as shown in the embodiments of the description) or in the upper rail of the seat rail or adjacent to the upper rail of the seat rail. Due to being arranged in or next to the upper rail of the seat rail, the seat is advantageously less high.

The seat adjustment mechanism previously characterized on the basis of functional and structural features can operate a seat adjustment kinematic system, in particular an easy-entry kinematic system of a seat for facilitated entry and exit of a person into/out of an interior of a motor vehicle, in which a backrest part is forcibly coupled with a seat part so that an adjusting movement of the backrest part is transmitted to the seat part.

The seat adjustment kinematic system or in other words, the course of motion during the adjustment of the seat according to the invention, can be characterized by two steps:

First Step:

In the first step, beginning from a starting position, the backrest part and the seat part of the seat are moved to an intermediate position by a first predetermined horizontal length, whereby the backrest part is moved in the longitudinal direction along a predetermined first horizontal backrest adjustment path and simultaneously, the tilt of the backrest part is moved from its starting position about a predetermined angle to its intermediate position, whereby the forcibly coupled seat part is also moved in the first step along a first predetermined horizontal seat part adjustment path, and a front side of the seat part is lowered simultaneously along a predetermined vertical adjustment path.

Second Step:

In the second step, the backrest part and the seat part are simultaneously mutually moved in the longitudinal direction along a predetermined second horizontal adjustment path to an easy-entry position.

For this purpose, the seat adjustment mechanism has a shifting-sliding device as a sliding device in the first and second embodiments, and in the third embodiment, a sliding-slotted guide device as a sliding device, as will be explained in more detail in the following description of the embodiments.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1A-1 is a representation of the kinematic system in FIG. 1A;

FIG. 1C-1 is a representation of the kinematic system in FIG. 1C;

FIG. 2A is a side view of a seat in a starting position with an easy-entry seat adjustment kinematic system according to an embodiment;

FIG. 2A-1 is a representation of the kinematic system in FIG. 2A;

FIG. 2B is a side view of the seat in an intermediate position with the easy-entry seat adjustment kinematic system;

FIG. 2C is a side view of the seat in an end position with the easy-entry seat adjustment kinematic system;

FIG. 2C-1 is a representation of the kinematic system in FIG. 2C;

FIG. 3A is a side view of a seat in a starting position with an easy-entry seat adjustment kinematic system;

FIG. 3A-1 is a representation of the kinematic system in FIG. 2A;

FIG. 3B is a side view of the seat in an intermediate position with the easy-entry seat adjustment kinematic system;

FIG. 3C is a side view of the seat in an end position with the easy-entry seat adjustment kinematic system; and FIG. 3C-1 is a representation of the kinematic system in FIG. 2C.

DETAILED DESCRIPTION

Figures 1A, 1B, 1C:
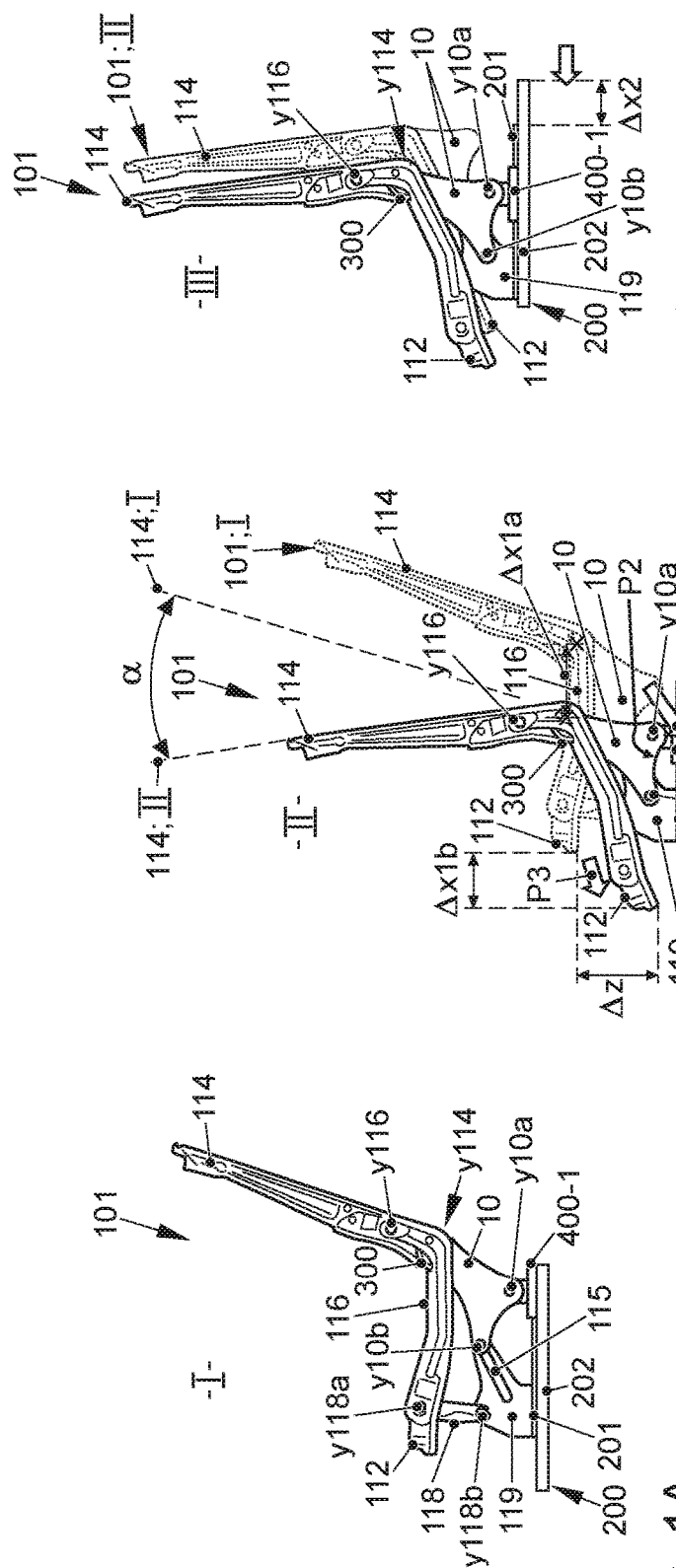
FIG. 1A is a side view of a seat in a starting position with an easy-entry seat adjustment kinematic system according to an embodiment.
FIG. 1B is a side view of the seat in an intermediate position with the easy-entry seat adjustment kinematic system.
FIG. 1C is a side view of the seat in an end position with the easy-entry seat adjustment kinematic system.
Figures 1, 1A, 1C:
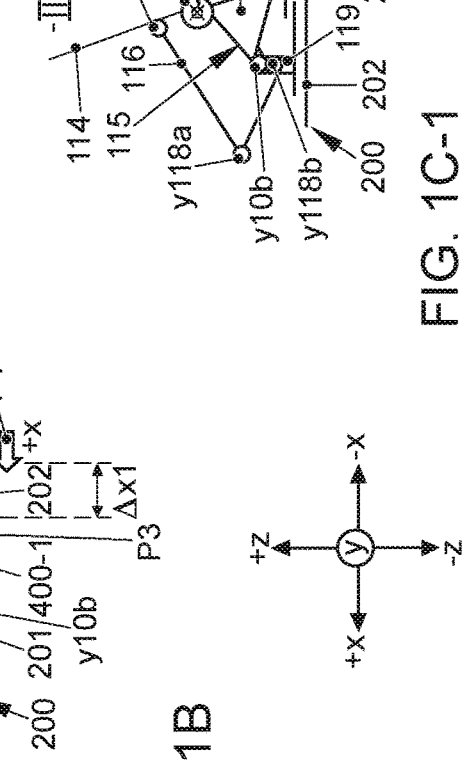

The invention is explained below. For the purposes of the present description, "+x" ("plus x") shall mean the usual direction of travel of a vehicle, "−x" ("minus x") shall mean the direction counter to its usual direction of travel, "y" shall denote the horizontal direction, transverse to the x-direction, and "z" shall denote the vertical direction, transverse to the x-direction. This terminology for the spatial directions in Cartesian coordinates corresponds to the coordinate system generally used in the automotive industry. Within all figures, the same reference numerals are used below for the same components, although components already presented may not be described again in all figures using reference numerals.

Subsequently, first the structure of the seat, in particular the vehicle seat, is explained in a synopsis of all the figures, wherein reference is made to those components that are analogously disposed in the first, second and third embodiments, and kinematically analogously connected to each other.

Following these explanations, the differences between the three embodiments will be discussed in more detail.

FIGS. 1A to 1C show a vehicle seat 101 in a first embodiment, and FIGS. 2A to 2C show a vehicle seat 102 in a second embodiment and FIGS. 3A to 3C show a vehicle seat 103 in a third embodiment, respectively in a plurality of side views. The description refers to the illustrated side views.

Figure 2E:
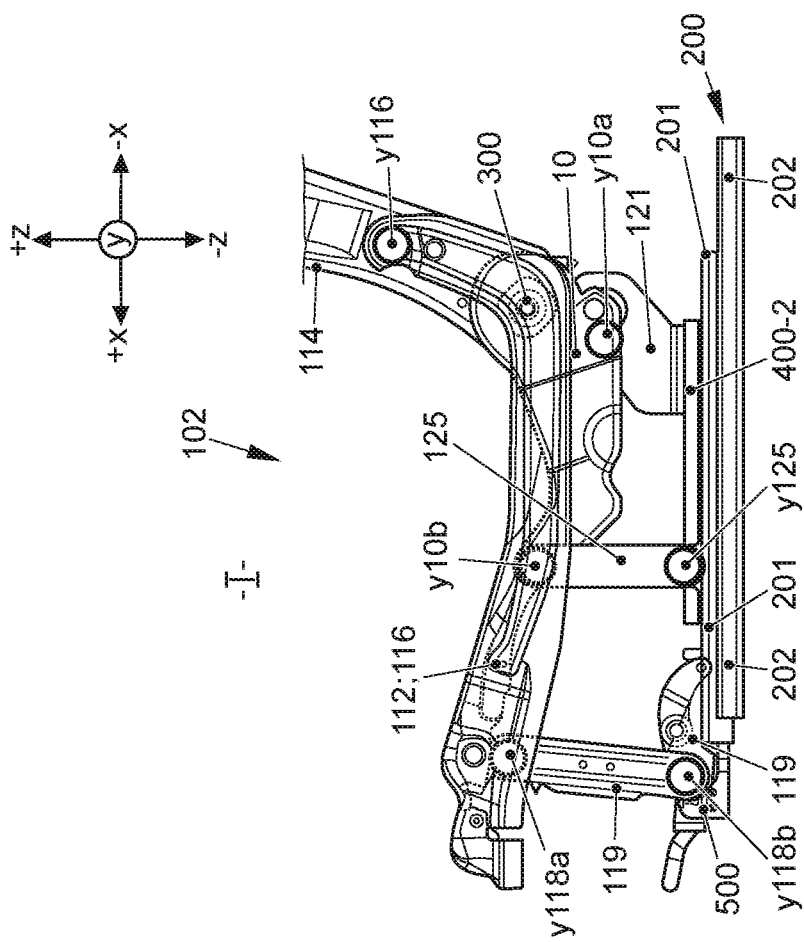
FIG. 2E is the prototype of the seat with the easy-entry seat adjustment kinematic system in a side view.
Figure 2D:
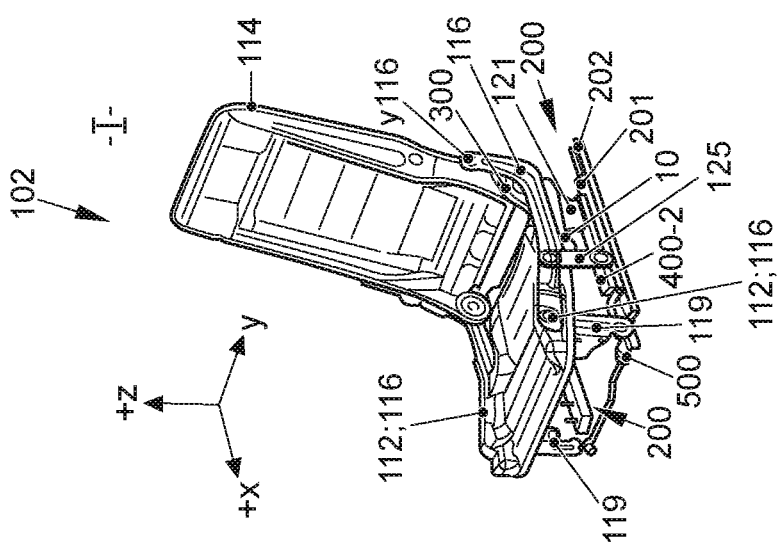
FIG. 2D is a prototype of the seat with the easy-entry seat adjustment kinematic system in a perspective view.

The basic configuration of the vehicle seats 101, 102, 103 and the specific technical solution according to the second embodiment is additionally shown in two illustrations in FIGS. 2D and 2E. It is recommended to look at all the figures in combination.

The vehicle seats 101, 102, 103 are axially symmetrically constructed in the longitudinal direction of a vehicle seat when viewed in the +/−x-direction, that is, the other non-visible side of the vehicle seats 101, 102 is constructed analogously, and therefore a description referencing a side view applies to all.

In addition, FIGS. 1A-1, and 1C-1 and 2A-1 as well as 2C-1 and 3A-1 and 3C-1, the illustrations whereof are reduced to the kinematic system of the vehicle seats 101, 102, are illustrated in reference to the representation in FIGS. 1A, 1C and 2A, 2C and 3A, 3C.

These side views of the vehicle seats 101, 102, 103 also apply to divided or undivided seat benches, which may also have or can carry out the embodiments and the functions of the vehicle seats 101, 102, 103 described below.

The following explanations of the vehicle seats 101, 102, 103 based on the figures can thus be analogously transmitted to an undivided seat bench as a whole or to a multi-part seat bench consisting of multiple vehicle seats.

The vehicle seats 101, 102, 103 include a seat part 112 and a backrest part 114.

The backrest part structure of the backrest part 114 is connected to the seat part structure of the seat part 112 via at least one rocker arm 116.

The at least one rocker arm 116 is on the one hand pivotally arranged on the backrest structure of the backrest part 114 via a rocker-pivot axis y116.

On the other hand, the at least one rocker arm 116 is fixedly connected to the seat part structure of the seat part 112. Due to the forcible coupling of the backrest part 114 to the seat part 112 via the rocker arm 116, the seat part 112 is always entrained during an adjusting movement of the backrest part 114.

The vehicle seats 101, 102, 103 have a coupling element 10. The coupling element 10 is fixedly connected to a backrest release unit 300 or the backrest release unit 300 is part of the coupling element 10.

The backrest release unit 300 has, for example, a first fitting part that is connected to the backrest structure. The backrest release unit 300 has a second fitting part, which is connected to the coupling element 10 or is part of the coupling element 10. The coupling element 10 has no direct connection to the seat part 112. By activating a not-shown adjusting member of the backrest release unit 300, the backrest part 114 is pivotally movable forward and backward about the backrest pivot axis y114, subject to the pivotal movement of the adjusting member of the backrest release unit 300 for the tilt adjustment of the backrest part 114 with respect to the seat part 112.

By releasing the backrest release unit 300, the backrest part 114 is pivotable with respect to the seat part 112 with respect to the rocker arm 116.

In the present invention, pivoting the backrest part 114 with respect to the seat part 112 for realizing the easy-entry function is not required, as will be explained below. This is seen as an advantage. As compared to the solutions in which the pivoting of the backrest part 114 via the backrest release unit 300 is part of the easy-entry function (see for example the publication DE 10 2013 012 284 A1), the backrest release unit 300 is not required for the present invention, allowing the backrest release unit 300 to be designed in a simplified manner.

The seat part 112 has on its front side, which is situated opposite the backrest part 114 in the normal use position of the vehicle seat 101, 102, 103, at least one pivot arm 118, which is pivotally arranged via an upper pivot arm-pivot axis y118a on one end of the seat part-side on the seat part structure 112 of the seat part 112.

At the other end, the pivot arm 118 is directly or indirectly pivotally arranged either (first and second embodiment) via a lower pivot arm-pivot axis y118b on an upper rail 201 of a seat rail 200 or via the lower pivot arm-pivot axis y118b on a sliding device 400; 400-3 (third embodiment) that is fixedly connected to the upper rail 201 of the seat rail 200, wherein the seat rail 200 includes a body-mounted lower rail 202. The other end of the pivot arm 118 may be suitably connected to the upper rail 201 and may be disposed in or on or adjacent to the upper rail 201 of the seat rail 200.

In the illustrated first two embodiments, the pivot arm 118 is indirectly connected to the upper rail 201 via a front base part 119. In other words, the connection is made via a front base part 119, which is firmly connected to the upper rail 201 and is non-pivotal with respect to the upper rail 20.

It is explicitly pointed out that the arrangement of the front base part 119 is not absolutely necessary. What is essential is the connection of the seat part structure of the seat part 112 by means of the pivot arm 118 via the upper and lower pivot arm-pivot axes y118a, y118b. Such a connection is realized in the third embodiment. Here, as previously explained, the pivot arm 118 is rotatably connected to the upper rail 201 of the seat rail 200 via the sliding device 400; 400-3, which is fixedly connected to the upper rail 201 of the seat rail 200.

The vehicle seats 101, 102, 103 are arranged on at least one seat rail 200, but mostly arranged longitudinally displaceably in a +/−x-direction on a seat rail pair consisting of two seat rails 200.

The upper rail 201 is arranged longitudinally displaceable with respect to the lower rail 202, wherein the lower rail 202 is fixedly arranged directly on the body K or indirectly on the body K.

On the upper rail 201, a sliding device 400 is arranged. The sliding device allows for the displacement of the vehicle seats 101, 102, 103 with respect to the upper rail 201 of the seat rail.

With the sliding device 400, the afore-mentioned coupling element 10 is pivotally connected via a coupling element pivot axis y10a.

In the first and second embodiments, the coupling element 10 is connected to the sliding device 400 via a rear base part 121, so that the coupling element pivot axis y10A is located in the rear base part 121. It is explicitly mentioned that the arrangement of the rear base part 121 is not absolutely necessary. Such an arrangement is realized in the third embodiment. There, the coupling element 10 is not connected to the sliding device 400; 400-3 via a rear base part 121, but instead it is directly connected to the sliding device 400; 400-3.

What is essential is the pivotal connection of the coupling element 10 to the sliding device 400, which occurs indirectly via the rear base part 121 as shown in the first two embodiments, or, as shown in the third embodiment, occurs directly by means of a pivotable connection of the coupling element 10 to the sliding device 400.

Hereinafter, the similarities and differences in the structure of the vehicle seat 101, 102, 103 shall be addressed in more detail according to the three embodiments.

In the first embodiment, the coupling element 10 has a slotted guide connection via a second coupling element pivot axis y10b, wherein in the illustrated first embodiment, a slotted guide 115 is realized in the front base part 119 by means of which the coupling element 10 is pivotable about the second coupling element pivot axis y10b with respect to the upper rail 201 via a slotted guide element engaging in the slotted guide 15, and by means of which said coupling element 10 can be moved within the slotted guide 115 with respect to the upper rail 201. The slotted guide element, for example a bolt (without reference number) or the like, lies in the y-direction on the second coupling element pivot axis y10b in the assembled state.

It is understood according to the previous embodiments that the slotted guide connection—consisting of slotted guide 115 and slotted guide element (no reference number)—may be an integral part of the upper rail 201 if the arrangement of a front base part 119, as shown in the illustrated first embodiment, is omitted.

The slotted guide connection on the one hand serves to guide the coupling element 10 as soon as the sliding device 400 is released with respect to the upper rail 201. The sliding device 400 according to the first embodiment is designed as a shifting-sliding device 400-1, the function of which will be explained in the associated functional description.

Via the slotted guide connection, on the other hand, forces, in particular crash forces which are introduced in the structure of the vehicle seat 101, are transmitted to the body-side structure of the vehicle. Thus, the forces acting in particular in the vehicle longitudinal direction are introduced to the body-side structure of the vehicle via the slotted guide connection in an improved manner. The coupling element 10 transmits forces introduced into the vehicle seat 101, which are transferred from the structure of the vehicle seat 101 to the coupling element 10 in the exemplary embodiment of the first embodiment, firstly via the slotted guide connection and secondly via the rear base 121 to the shifting-sliding device 400-1, and finally to the seat rail 200 and thus through the upper and lower rails 201, 202 to the body-side structure of the vehicle.

The connection of the coupling element 10 to the front base 119 via the slotted guide connection causes a combined static stabilization of the connection of the vehicle seat 101 to the upper rail 201 of the seat rail 200 and an increase in the forces which can be received by the vehicle seat 101 as well as forcible guidance of the coupling element 10 and thus of the vehicle seat 101 during the reversible easy-entry movement.

In the second embodiment, the coupling element 10 has an articulated connection and no slotted guide connection. In contrast to the first embodiment, a articulated lever 125 is arranged on the coupling element 10 via the second coupling element pivot axis y10b. A connecting element, such as a bolt or the like, rests on the second coupling element pivot axis y10b in the y-direction in the assembled state and engages through the coupling element 10 and the coupling-element-side end of the articulated lever 125. By means of its end situated opposite the coupling element 10, the articulated lever 125 is also pivotally attached to the upper rail 201 via an articulated lever pivot axis y125.

On the one hand, the articulated lever 125 serves to guide the coupling element 10 as soon as the shifting device 400 is released with respect to the upper rail 201. The sliding device 400 according to the second embodiment is also designed as a shifting-sliding device 400-2, whose function analogous to the first embodiment is explained in the associated functional description.

On the other hand, the articulated lever 125 serves to transmit forces, in particular crash forces which are introduced into the structure of the vehicle seat 102 via the coupling element 10 via the upper rail 201 to the body-side structure of the vehicle. Thus, the forces acting in particular in the vehicle longitudinal direction are introduced in an improved manner. The coupling element 10 transmits forces, in particular crash forces, which are transmitted from the structure of the vehicle seat 102 to the coupling element 10, firstly to the articulated lever 125 and thus to the upper rail 201 of the seat rail 200, and secondly via the rear base 121 and the sliding device 400-1 to the upper rail 201 and thus also to the lower rail 202 of the seat rail 200, thereby advantageously vectorially introducing substantially horizontally (in the x-direction) acting and substantially vertically acting forces to the body-side structure of the vehicle.

The connection via the articulated lever 125 causes a static stabilization of the connection of the vehicle seat 102 to the seat rail 200 and an increase in the forces that can be absorbed by the vehicle seat 102, as well as a forcible guidance of the coupling element 10 and thus of the vehicle seat 102 during the reversible easy-entry movement.

A prototype of the vehicle seat 102 according to the second embodiment is shown with the same reference numerals in FIGS. 2D and 2E in a perspective view and in a side view.

Analogously to the second embodiment in the third embodiment, the coupling element 10 has an articulated connection and no slotted guide connection. In contrast to the first embodiment, as also in the second embodiment, an articulated lever 125 is arranged on the coupling element 10 via the second coupling element pivot axis y10b.

A slotted guide, for example a bolt (without reference numeral) or the like, rests in the y-direction on the second coupling element pivot axis y10b in the assembled state and engages through the coupling element 10 and the coupling-element-side end of the articulated lever 125. Unlike in the second embodiment, the articulated lever 125 is not directly attached to the upper rail 201 with its end situated opposite the coupling element 10 via an articulated lever pivot axis y125, but instead is attached to a sliding device 400-3 which is firmly connected to the upper rail 201. The sliding-slotted guide device 400-3 comprises a slotted guide 400-31 extending in the x-direction, the function of which will be explained in the associated functional description.

The articulated lever 125 serves on the one hand to guide the coupling element 10 as soon as the coupling element 10 is released from the upper rail 201, as will be discussed below.

The coupling element 10 has a recess 10-1, which serves in a starting position I of the vehicle seat 103 to position the coupling element 10 on the upper rail 201.

The upper rail 201 comprises a positioning element 201-1, which in the starting position I of the vehicle seat 103 engages in the recess 10-1 of the coupling element 10.

The coupling element 10 further includes a slotted guide element (not numbered), such as a bolt or the like, which in the assembled state extends in the y-direction on the first coupling member pivot axis y10a. In the assembled state, the slotted guide element engages through the coupling element 10 and the slotted guide 400-31 in the sliding-slotted guide device 400-3.

The articulated lever 125, on the other hand, serves to transmit forces, in particular crash forces which are introduced into the structure of the vehicle seat 102, via the coupling element 10 and the sliding-slotted guide device 400-3 to the upper rail 201, and from there, via the lower rail 202 to the body-side structure of the vehicle. Thus, the forces acting in particular in the vehicle longitudinal direction are introduced in an improved manner. The coupling element 10 transmits forces, in particular crash forces, which are transmitted from the structure of the vehicle seat 102 to the coupling element 10, firstly to the articulated lever 125 and then via the sliding-slotted guide device 400-3 to the upper rail 201 of the seat rail 200, and secondly via the slotted guide connection—consisting of slotted guide 400-31 and slotted guide element (without reference numeral)—of the coupling element 10 via the slotted guide 400-31 of the sliding-slotted guide device 400-3 to the upper rail 201 of the seat rail 200 and thus, to the lower rail 202 of the seat rail 200, whereby in an advantageous manner, substantially horizontally (x-direction) acting and substantially vertically acting forces are vectorially introduced into the body-side structure of the vehicle.

The connection of the articulated lever 125 between the coupling element 10 and the sliding-slotted guide device 400-3 causes a static stabilization of the connection of the vehicle seat 103 to the seat rail 200 and an increase of the forces that can be absorbed by the vehicle seat 103 as well as forcible guidance of the coupling element 10 and thus of the vehicle seat 103 during the reversible easy-entry movement.

The Easy-Entry Function According to the First Embodiment:

First Step: Adjustment of the Vehicle Seat 101 Based on FIG. 1A to FIG. 1B:

In FIG. 1A, the vehicle seat 101 is arranged in a starting position I and in FIG. 1B, in the intermediate position II.

First, beginning from the starting position I by activating an release element, the shifting-sliding device 400, 400-1 is released with respect to the upper rail 201.

The shifting-sliding device 400, 400-1 is forwardly moved in the +x-direction with respect to the upper rail 201 by a predetermined first horizontal length $\Delta x1$ along a first adjustment path as shown by the arrow P1 in FIG. 1B, so that the vehicle seat 101 (the backrest part 114 and the seat part 112 together) reaches an intermediate position II after reaching a end stop according to FIG. 1B. The end stop(s) may be the end of the slotted guide 115 facing away from the coupling element 10 and/or a stop of the shifting-sliding device 400, 400-1 with respect to the upper rail 201.

The backrest part 114 is rigidly connected to the backrest release unit 300 of the backrest part 114 via the coupling element 10, which is pivotable about the first coupling element pivot axis y10a with respect to the shifting-sliding device 400, 400-1, whereby the backrest part 114 is moved in the longitudinal direction +x along a first predetermined horizontal backrest part adjustment path $\Delta x1a$ and at the same time, the tilt of the backrest part 114 is moved from its starting position I about a predetermined angle $\alpha$ to the intermediate position II, wherein the forcibly coupled seat part 112 which is directly supported on a pivot arm 118 on the upper rail 201 of the seat rail 200 is moved in the first step in the longitudinal direction +x along a first horizontal seat part adjustment path $\Delta x1b$, and a front side of the seat part 112 is lowered simultaneously along a vertical adjustment path $\Delta z$.

In this first step, a first sliding movement of the vehicle seat 101 is thus initiated.

By means of the first sliding movement of the vehicle seat 101 and the forcible guidance of the coupling element 10 via the slotted guide element in the slotted guide 115, the backrest part 114 also pivots about the first coupling element pivot axis y10A, as the arrow P2 illustrates in FIG. 1B.

Thus, already in the first step, a sliding-pivotal movement of the backrest part 114 and the seat part 112 is brought about. In other words, a sliding movement and a pivoting movement of the backrest part 114 and the seat part 112 take place simultaneously. This is also referred to as a superimposed sliding-pivoting movement of the backrest part 114 and the seat part 112.

In the first step, as shown by the arrow P3 in FIG. 1B, the seat part 112 descends with its front edge in the −z-direction owing to its kinematic structure and its connection to the backrest part 114 via the rocker arm 116 and to the upper rail 201 via the pivot arm 118 and the front base part 119.

Thus, in the first step, the backrest part 114 is pivoted about the first coupling element pivot axis y10A and simultaneously, the backrest part 114 is moved forwards in the +x-direction along the first horizontal backrest part adjustment path $\Delta x1a$, wherein the seat part 112 is entrained in the +x-direction along the first horizontal seat part adjustment path $\Delta x1b$ by means of the rocker arm 116, which is arranged between the backrest part structure and the seat part structure and which descends with its front edge in the −z-direction on a predetermined adjustment path by a predetermined vertical length $\Delta z$.

The pivot arm 118 is thereby pivoted about the rocker arm-pivot axes y118a and y118b from the substantially vertical position shown in FIG. 1A to the substantially horizontal position shown in FIG. 1B.

In the first step, when the backrest part 114 is pivoted forward about the first coupling element pivot axis y10A, a slotted guide-controlled forcible entrainment of the seat part 112 is caused due to the forcible coupling of the seat part 112 to the backrest part 114 via the rocker arm 116.

As shown in FIG. 1B, the backrest part 114 is pivoted forward from its starting position 114; I in the +x-direction along the first horizontal backrest part adjustment path $\Delta x1a$ and is simultaneously pivoted forward about the first coupling element pivot axis y10b about a predetermined pivot angle $\alpha$ to the intermediate position 114; II.

Depending on the rocker arm shape of the rocker arm 116 and/or the orientation of the slotted guide 115 with respect to an imaginary horizontal and/or depending on the length of the predetermined first horizontal length $\Delta x1$, different pivot angles $\alpha$ of the backrest part 114 with respect to the starting position 114; I or adjusting movements $\Delta x1a$ of varying lengths of the backrest part 114 in the +x-direction can be realized.

After carrying out the first step, a first clearance is already created in the shoulder region and in the foot region behind the vehicle seat 101, which makes it possible to pass objects into or from the interior of the vehicle through a corresponding door opening of a vehicle, or even for persons to enter or exit.

Second Step: Adjustment of the Vehicle Seat 101 Based on FIG. 1B to FIG. 1C:

In the second step, it is ensured that the upper rail 201 is released with respect to the lower rail 202. The release takes place via a seat rail release unit 500 shown only in FIG. 2D.

In the second step, the entire vehicle seat 101 moves even further forward in the +x-direction along a predetermined second adjustment path by a predetermined second horizontal length $\Delta x2$, whereby the first clearance is further enlarged and a second enlarged clearance is created in the shoulder region and in the foot region behind the vehicle seat 101. It is particularly advantageous that in the first step, the coupling element 10 has already been pivoted via the first coupling element pivot axis y10a, whereby after the second step, in which the coupling element 10 is also moved forward by the predetermined horizontal length $\Delta x2$, the second clearance is also available especially in the foot region for the trouble-free entry and exit of persons, whereby the second space is available even after implementing the second step, especially in the foot region for the trouble-free entry and exit of persons.

The second step thus represents a second sliding movement of the vehicle seat 101 in the +x-direction by the predetermined horizontal length Δx2 to the end position III, the so-called easy-entry position, wherein the second predetermined length Δx2 is determined by the movement in the +x-direction of the upper rail 201 with respect to the lower rail 202, as illustrated in FIG. 1C.

In this second step, the front side of the seat part 112 does not further descend in the z-direction since the movement of the vehicle seat 101 in the second step only occurs in the +x-direction, that is, no further pivoting movement about the first coupling element pivot axis y10A of the coupling element 10 takes place in the second step.

The Easy-Entry Function According to the Second Embodiment:

First Step: Adjustment of the Vehicle Seat 102 Based on FIG. 2A to FIG. 2B:

In FIG. 2A, the vehicle seat 102 is arranged in a starting position I.

First, beginning from the starting position I by activating a release element, the shifting-sliding device 400, 400-2 is released with respect to the upper rail 201.

The shifting-sliding device 400, 400-2 is moved forward in the +x-direction by the predetermined first horizontal length Δx1 with respect to the upper rail 201, as shown by the arrow P1 in FIG. 2B, so that upon reaching an end stop shown in FIG. 2B, the vehicle seat 102 reaches its intermediate position II. An end stop may be a stop of the shifting-sliding device 400, 400-2 with respect to the upper rail 201.

In the second embodiment, the backrest part 114 is also rigidly connected to the backrest release unit 300 of the backrest part 114 via the coupling element 10, which is pivotable about the first coupling element pivot axis y10a with respect to the shifting-sliding device 400, 400-2, whereby the backrest part 114 is likewise moved in the longitudinal direction +x along a first predetermined horizontal backrest part adjustment path Δx1a and simultaneously, the tilt of the backrest part 114 is moved from its starting position I about a predetermined angle α to its intermediate position II, wherein in the first step, the forcibly coupled seat part 112 directly supported on the pivot arm 118 on the upper rail 201 of the seat rail 200 is moved in the longitudinal direction +x along a first horizontal seat part adjustment path Δx1b, and a front side of the seat part 112 is lowered simultaneously along a vertical adjustment path Δz.

Thus, in this first step, the vehicle seat 102 is also moved forward in a first sliding movement.

By means of the first sliding movement of the vehicle seat 102 along Δx1 of the shifting-sliding device 400, 400-2 with respect to the upper rail 201, and the forcible guidance of the coupling element 10 via the articulated lever 125, a pivoting movement of the backrest part 114 is carried out analogously to the first embodiment about the first coupling element pivot axis y10A, as the arrow P2 in FIG. 2 B illustrates.

Analogously to the first embodiment, a sliding-pivoting movement of the backrest part 114 and the seat part 112 takes place. In other words, also in the second embodiment of the vehicle seat 102, a sliding movement and a pivoting movement of the backrest part 114 and the seat part 112 take place simultaneously.

In this case, in the second embodiment, the seat part 112 also descends with its front edge in the −z-direction, as shown by the arrow P3 in FIG. 2B. Thus, in the first step, the backrest part 114 pivots about the first coupling element pivot axis y10A and simultaneously, the backrest part 114 is moved forward in the +x-direction along the first horizontal backrest part adjustment path Δx1a, wherein the seat part 112 is entrained in the +x-direction along the first horizontal seat part adjustment path Δx1b by the rocker arm 116 arranged between the backrest part structure and the seat part structure, thereby descending with its front edge in the −z-direction by a predetermined vertical length Δz.

The pivot arm 118 is thereby pivoted about the pivot arm-pivot axes y118a and y118b from the substantially vertical position shown in FIG. 1A to the substantially horizontal position shown in FIG. 2B.

In the first step, when the backrest part 114 is pivoted forward about the first coupling element pivot axis y10a, a forcible entrainment of the seat part 112 controlled by the articulated lever 125 takes place via the forcible coupling of the seat part 112 to the backrest part 114 via the rocker arm 116.

As shown in FIG. 2B, the backrest part 114 is pivoted forward in the +x-direction with respect to its starting position 114; I, along the first horizontal back part adjustment path Δx1a and at the same time, is pivoted forward about the first coupling element pivot axis y10b about a predetermined pivot angle α to its intermediate position 114; II.

It is understood that, depending on the rocker arm shape of the rocker arm 116 and/or the configuration of the articulated lever 125 (shape of the articulated lever 125 and/or length of the articulated lever 125, location of the connection of the articulated lever 125 to the coupling element 10 and/or location of the connection of the articulated lever 125 on the upper rail 201) with respect to an imaginary horizontal and/or depending on the length of the predetermined first horizontal length Δx1, different pivot angles α of the backrest part 114 can be predetermined in the +x-direction with respect to the imaginary vertical line or to adjustments of the backrest part 114 of different lengths along the first horizontal backrest part adjustment path Δx1a and the seat part 112 along the first horizontal seat part adjustment path Δx1b.

After performing the first step, analogous to the first embodiment, a first clearance is already created in the shoulder region and in the foot region behind the vehicle seat 102, which already permits the passing through of articles into the interior of the vehicle or out of the interior of the vehicle through a corresponding door opening of a vehicle, including the entry and exit of persons.

Second Step: Adjustment of the Vehicle Seat 102 as Shown in FIG. 2B to FIG. 2C:

In the second step, it is ensured that the upper rail 201 is released with respect to the lower rail 202. The release takes place via a seat rail release unit.

In the second step, the entire vehicle seat 102 moves further forward in the +x-direction by a predetermined second horizontal length Δx2, whereby the first clearance is further increased and a second enlarged clearance is created in the shoulder region and in the foot region behind the vehicle seat 101. It is advantageous that the coupling element 10 has already been pivoted about the first coupling element pivot axis y10A in the first step, whereby the second clearance is also available for the trouble-free entry and exit of people after the second step, in which the coupling element is entrained forward by the second predetermined horizontal length Δx2, especially in the foot region.

The second step thus represents a second sliding movement of the vehicle seat 101 in the +x-direction by the second predetermined horizontal length Δx2 to the end position III, the so-called easy-entry position, wherein the second predetermined horizontal length $\Delta x2$ is determined, as illustrated in FIG. 2C, by the predetermined movement of the upper rail 201 in the +x-direction with respect to the lower rail 202.

In this second step, the front side of the seat part 112 does not continue to descend in the z-direction since the movement of the vehicle seat 101 in the second step only occurs in the +x direction, that is, a further pivoting movement about the first coupling element pivot axis y10a of the coupling element 10 does not take place in the second step.

The description clearly shows that the tilt of the backrest part 114 within the easy-entry movement does not take place via the backrest release unit 300, but instead is realized via the coupling element 10 and the slotted guide connection (first embodiment) or the articulated connection (second embodiment). Due to the arrangement and kinematic connection of the coupling element 10, additional floor entry space is obtained as compared to the prior art.

The Easy-Entry Function According to the Third Embodiment:

First Step: Adjustment of the Vehicle Seat 103 Based on FIG. 3A to FIG. 3B:

In FIG. 3A, the vehicle seat 103 is arranged in a starting position I.

First, beginning from the starting position I, the vehicle seat 103 is released with respect to the sliding-slotted guide device 400, 400-3 by activating a release element The recess 10-1 of the coupling element 10, in which the positioning element 201-1 rests in the starting position I of the vehicle seat 103, can be guided out of the recess 10-1 of the coupling element 10 after releasing by pivoting the vehicle seat 103.

The coupling element 10 and thus the vehicle seat 103 is pivotally displaceable in the +x direction via the slotted guide element about the first coupling element pivot axis y10a. In the assembled state, the slotted guide element engages through the coupling element 10 and the slotted guide 400-31 in the sliding-slotted guide device 400-3 so that simultaneously, a reversible pivoting movement of the coupling element 10 about the first coupling element pivot axis y10A and a reversible adjustment of the coupling element 10 within the slotted guide 400-31 in the −/+x-direction is possible.

The coupling element 10, which is pivotable about the first coupling element pivot axis y10a, is simultaneously moved forward in the slotted guide 400-31 according to the selected length of the slotted guide 400-31 by the predetermined first horizontal length $\Delta x1$ in the +x-direction, as shown by the arrow P1 in FIG. 3B, so that after reaching a slotted guide-side end stop according to FIG. 3B, the vehicle seat 103 reaches its intermediate position II (see FIG. 3B).

In the third embodiment, the backrest part 114 is rigidly connected to the backrest release unit 300 of the backrest part 114 via the coupling element 10, which is pivotable with respect to the sliding device 400, 400-3 about the first coupling element pivot axis y10a, whereby the backrest part 114 is also moved in the longitudinal direction +x by a first predetermined horizontal backrest part adjustment path $\Delta x1a$ and simultaneously, the tilt of the backrest part 114 is moved from its starting position I about a predetermined angle α to its intermediate position II, wherein in the first step, the forcibly coupled seat part 112 indirectly supported on the pivot arm 118 and thus on the sliding device 400-3 and thus on the upper rail 201 of the seat rail 200 is moved in the longitudinal direction +x along a first horizontal seat part adjustment path $\Delta x1b$, and a front side of the seat part 112 is simultaneously lowered along a vertical adjustment path $\Delta z$.

In this first step, thus the vehicle seat 103 moves forward in a first sliding movement.

By means of the first sliding movement of the vehicle seat 103 by $\Delta x1$ within the slotted guide 400-31 of the shifting-sliding device 400-3 fixedly connected to the upper rail 201 and with the forcible guidance of the coupling element 10 via the articulated lever 125, a pivotal movement of the backrest part 114 about the first coupling element pivot axis y10a takes place analogously to the other embodiments, as the arrow P2 illustrates in FIG. 3B.

In this configuration in the third embodiment, similar to the two previously described embodiments, a sliding-pivoting movement of the backrest part 114 and the seat part 112 takes place. In other words, also in the third embodiment of the vehicle seat 103 there is a simultaneous sliding movement and a pivoting movement of the backrest part 114 and the seat part 112.

In the third embodiment, the seat part 112 also descends with its leading edge in the −z-direction, as shown by the arrow P3 in FIG. 3B. In the first step, thus, the backrest part 114 pivots about the first coupling element pivot axis y10A and simultaneously, the backrest part 114 is moved forward in the +x-direction along the first horizontal backrest part adjustment path $\Delta x1a$, wherein the seat part 112 is entrained in the +x-direction by the rocker arm 116 arranged between the backrest part structure and the seat part structure along the first horizontal seat part adjustment path $\Delta x1b$, thereby descending with its leading edge in the −z-direction by a predetermined vertical length $\Delta z$.

The pivot arm 118 is thereby pivoted about the pivot arm-pivot axes y118a and y118b from the substantially vertical position shown in FIG. 3A to the substantially horizontal position shown in FIG. 3B.

In the first step, when the backrest part 114 is pivoted forward about the first coupling element pivot axis y10a, a forcible entrainment of the seat part 112 controlled by the articulated lever 125 takes place by means of the forcible coupling of the seat part 112 to the backrest part 114 via the rocker arm 116.

The backrest part 114, as shown in FIG. 3B, is pivoted forwards in the +x-direction with respect to its starting position 114; I along the first horizontal backrest part adjustment path $\Delta x1a$ and at the same time, forward about the first coupling element pivot axis y10b about a predetermined pivot angle α to its intermediate position 114; II.

It is understood that depending on the rocker arm shape of the rocker arm 116 and/or the configuration of the articulated lever 125 (shape of the articulated lever 125 and/or length of the articulated lever 125, location of the connection of the articulated lever 125 to the coupling element 10 and/or location of the connection of the articulated lever 125 on the sliding-slotted guide device 400-3) with respect to an imaginary horizontal, and/or depending on the length of the slotted guide 400-31 and thus of the predetermined first horizontal length $\Delta x1$, different pivot angles α of the backrest part 114 with respect to the imaginary vertical or adjusting movements of the backrest part 114 of varying lengths along the first horizontal backrest part adjustment path $\Delta x1a$ and of the seat part 112 along the first horizontal seat part adjustment path $\Delta x1b$ in the +x-direction can be predetermined.

After executing the first step, analogously to the two other embodiments, a first clearance is already created in the shoulder region and in the foot region behind the vehicle seat 102, which already permits the passing through of articles into the interior of the vehicle or out of the interior of the vehicle through a corresponding door opening of a vehicle, including the entry and exit of persons.

Second Step: Adjustment of the Vehicle Seat 103 Based on FIG. 3B to FIG. 3C:

In the second step, it is ensured that the upper rail 201 together with the sliding-slotted guide device 400, 400-3 which is fixedly arranged on the upper rail 201 is released with respect to the lower rail 202. The release takes place via a seat rail release unit.

In the second step, the entire vehicle seat 103 thus continues to move forward in the +x-direction by a predetermined second horizontal length Δx2 as a result of the adjustment of the upper rail 201 with respect to the lower rail 202, whereby the first clearance is further increased and a second enlarged clearance in the shoulder region and in the foot region is created behind the vehicle seat 101. It is advantageous that the coupling element 10 has already been pivoted about the first coupling element pivot axis y10a in the first step, whereby the first clearance created in the first step is available also after the second step, in which the coupling element 10 is no longer pivoted but instead is moved forward by the second predetermined horizontal length Δx2, for the trouble-free entry and exit of people, especially in the foot region.

The second step thus represents a second sliding movement of the vehicle seat 101 in the +x-direction by the second predetermined horizontal length Δx2 to the end position III, the so-called easy-entry position, wherein the second predetermined horizontal length Δx2 is determined by the movement of the upper rail 201 predetermined in the +x-direction together with the sliding-slotted guide device 400, 400-3 with respect to the lower rail 202, as illustrated in FIG. 3C.

In this second step, the front side of the seat part 112 does not descend further in the z-direction since the movement of the vehicle seat 101 in the second step takes place only in the +x-direction, that is, a further pivotal movement about the first coupling element pivot axis y10a of the coupling element 10 does not take place in the second step.

The description demonstrates that the tilt of the backrest part 114 within the easy-entry movement does not take place via the backrest release unit 300, but instead via the coupling element 10, and that the slotted guide connection is realized via the slotted guide 115 (first embodiment) or the articulated connection via the articulated lever 125 (second and third embodiment). Due to the arrangement and kinematic connection of the coupling element 10, additional free foot space is obtained as compared to the prior art.

The solutions differ from the publication DE 10 2013 012 284 A1. There, in the easy-entry function, the control and path limitation of the detent fitting for the tilt adjustment of the backrest part takes place via a slotted guide on/in the side panel. The movement of the backrest part is effected upstream of a movement of the vehicle seat in the vehicle longitudinal direction. In contrast, in the easy-entry function according to the present invention, the movement of the backrest part 114 is performed by means of longitudinal adjustment of the vehicle seat 101, 102, 103 by means of the sliding device 400; 400-1, 400-2, 400-3 described in the embodiments.

Here, a tilt adjustment of the backrest part 114 is caused synchronously without activating a detent fitting via the described slotted guide connection via the slotted guide 115 (first embodiment) or via the described articulated connection via the articulated lever 125 (second and third embodiment). The detent fitting of the vehicle seat 101, 102, 103 of the present invention remains locked in the easy-entry function. As explained, the tilt of the backrest part 114 in all the embodiments illustrated is realized in an advantageous manner by a simple pivoting of the coupling element 10 about the first coupling element pivot axis y10A.

Compared to the publications DE 10 2007 036 450 B3 and DE 10 2008 050 468 B3, the difference in the inventive solution is particularly that according to the three embodiments of the sliding devices 400; 400-1, 400-2, 400-3, the coupling element 10 does not need to be decoupled from the respective sliding device 400 and thus not need to be decoupled from the upper rail 201 of the seat rail 200 consisting of upper rail 201 and lower rail 202. Thus, there is no need to keep the region below the vehicle seat free to be able to fold back the vehicle seat. The region below the vehicle seat 101, 102, 103 does not become accessible in the intermediate position II and in the easy-entry position III since the coupling element 10 and the sliding devices 400; 400-1, 400-2, 400-3 always stay in contact with the upper rail 201.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A seat adjustment mechanism of a seat for facilitating entry and exit of a person into/out of the interior of a motor vehicle, in which a backrest part is forcibly coupled to a seat part via a rocker arm so that an adjustment movement of the backrest part is transmitted to the seat part, wherein, in a first step, beginning from a starting position, by a first predetermined horizontal length via a sliding device connected to an upper rail of a seat rail, the backrest part and the seat part of the seat are moveable to an intermediate position, wherein the backrest part is rigidly connected to a backrest release unit of the backrest part via a coupling element that is pivotable with respect to the sliding device about a first coupling element pivot axis, wherein the backrest part is movable in the longitudinal direction along a first predetermined horizontal backrest part adjustment path and substantially simultaneously, a tilt of the backrest part is adjustable about a predetermined angle when the backrest part is moved from the starting position to the intermediate position, and wherein, in the first step, the forcibly coupled seat part, which is supported on a pivot arm that is directly or indirectly connected to the upper rail of the seat rail, is moved in the longitudinal direction along a first horizontal seat part adjustment path, and a front side of the seat part is lowered substantially simultaneously along a vertical adjustment path, after which, in a second step, the backrest part and the seat part are substantially simultaneously mutually moved further in the longitudinal direction along a predetermined second horizontal adjustment path to an easy-entry position by releasing the upper rail with respect to a body-mounted lower rail of the seat rail, wherein, in the first step, the backrest part is forcibly controlled and forcibly guided via an articulated lever of an articulated lever connection, from the starting position to the intermediate position, wherein one end of the articulated lever is pivotally connected to the coupling element about a second coupling element pivot axis and at the other end, the articulated lever is pivotally connected to the sliding device about an articulated lever pivot axis, wherein the sliding device is rigidly connected to the upper rail of the seat rail, wherein the coupling element is pivotable via the articulated lever about the second coupling element pivot axis during the forcible control and forcible guidance of the coupling element, and wherein the sliding device is a sliding-slotted guide device, which is rigidly connected to the upper rail of the seat rail, wherein the sliding-slotted guide device has a slotted guide in which a slotted guide pin engages, wherein the slotted guide pin is connected to the coupling element, and wherein after releasing the coupling element which is locked on the upper rail, the slotted guide element is reversibly displaceable in the slotted guide.

2. The seat adjustment mechanism according to claim 1, wherein the tilt of the backrest part is reversibly adjustable via the backrest release unit with respect to the seat part, and independent of the seat part, wherein the backrest release unit has a rotational adjustment mechanism with a first fitting part arranged on a backrest part and a second fitting part rigidly arranged on the coupling element.

3. The seat adjustment mechanism according to claim 2, wherein the coupling element is part of the second fitting part or is rigidly connected to the second fitting part.

4. The seat adjustment mechanism according to claim 1, wherein the sliding device is connected to the upper rail of the seat rail and is arranged either on the upper rail of the seat rail or in the upper rail of the seat rail or adjacent to the upper rail of the seat rail.

5. A seat adjustment kinematic system of a seat for the facilitated entry and exit of a person into/out of an interior of a motor vehicle, in which a backrest part is forcibly coupled with a seat part such that an adjusting movement of the backrest part is transmitted to the seat part, wherein, in a first step, the backrest part and the seat part of the seat are moved from a starting position to an intermediate position by a first predetermined horizontal length via a sliding device connected to an upper rail of a seat rail, wherein the backrest part is rigidly connected to a backrest release unit of the backrest part via a coupling element that is pivotable with respect to the sliding device about a first coupling element pivot axis, wherein the backrest part is moved in the longitudinal direction along a predetermined first horizontal backrest part adjustment path and substantially simultaneously, a tilt of the backrest part is adjusted about a predetermined angle when the backrest part is moved from the starting position to the intermediate position, wherein, in the first step, the forcibly coupled seat part is also moved along a first predetermined horizontal seat part adjustment path, and a front side of the seat part is lowered simultaneously along a predetermined vertical adjustment path, after which in a second step, the backrest part and the seat part are substantially simultaneously mutually moved further in the longitudinal direction along a predetermined second horizontal adjustment path to an easy-entry position, wherein, in the first step, the backrest part is forcibly controlled and forcibly guided from the starting position to the intermediate position via an articulated lever, wherein one end of the articulated lever is pivotally connected to the coupling element about a second coupling element pivot axis and at the other end, the articulated lever is pivotally connected to the sliding device about an articulated lever pivot axis, wherein the sliding device is rigidly connected to the upper rail of the seat rail, wherein the coupling element is pivotable via the articulated lever about the second coupling element pivot axis during the forcible control and forcible guidance of the coupling element, and wherein the sliding device is a sliding-slotted guide device, which is rigidly connected to the upper rail of the seat rail, wherein the sliding-slotted guide device has a slotted guide in which a slotted guide pin engages, wherein the slotted guide pin is connected to the coupling element, and wherein after releasing the coupling element which is locked on the upper rail, the slotted guide element is reversibly displaceable in the slotted guide.

6. The seat adjustment kinematic system according to claim 5, wherein, in each position, the tilt of the backrest part is reversibly adjustable via a backrest release unit with respect to the seat part, and independently of the seat part.

7. A seat comprising: an easy-entry function with a seat adjustment mechanism according to claim 1.

8. The seat adjustment mechanism according to claim 1, wherein the upper rail includes a positioning element and the coupling element includes a recess, wherein in the starting position, the positioning element of the upper rail is engaged in the recess of the coupling element, and wherein in the intermediate position, the recess of the coupling element is disengaged from the positioning element of the upper rail.

* * * * *